US011065636B2

(12) United States Patent
Fideler et al.

(10) Patent No.: US 11,065,636 B2
(45) Date of Patent: Jul. 20, 2021

(54) AERIAL FLUID SPRAYING SYSTEM

(71) Applicant: Wagner Spray Tech Corporation, Plymouth, MN (US)

(72) Inventors: Brian Lee Fideler, Jordan, MN (US); Jeshwanth Durga Sagar Kundem, Minneapolis, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 117 days.

(21) Appl. No.: 16/273,638

(22) Filed: Feb. 12, 2019

(65) Prior Publication Data
US 2019/0247877 A1 Aug. 15, 2019

Related U.S. Application Data

(60) Provisional application No. 62/631,110, filed on Feb. 15, 2018.

(51) Int. Cl.
*B05B 13/00* (2006.01)
*B64C 39/02* (2006.01)
*B64D 1/18* (2006.01)

(52) U.S. Cl.
CPC .......... *B05B 13/005* (2013.01); *B64C 39/024* (2013.01); *B64D 1/18* (2013.01); *B64C 2201/027* (2013.01); *B64C 2201/12* (2013.01)

(58) Field of Classification Search
CPC ................ B05B 13/005; B64C 39/024; B64C 2201/027; B64C 2201/12; B64D 1/18
See application file for complete search history.

(56) References Cited

U.S. PATENT DOCUMENTS

| 5,601,256 A | * | 2/1997 | Harris | B64C 9/38 244/52 |
| 6,003,787 A | * | 12/1999 | Fisher | A01M 7/0017 239/355 |
| 9,611,038 B2 | | 4/2017 | Dahlstrom | |
| 10,011,352 B1 | | 7/2018 | Dahlstrom | |
| 2004/0069866 A1 | | 4/2004 | Ireland | |

(Continued)

FOREIGN PATENT DOCUMENTS

WO WO 2017191469 A1 11/2017
WO WO 2017220803 A2 12/2017

(Continued)

OTHER PUBLICATIONS

International Search Report and Written Opinion for International Patent Application No. PCT/US2019/017834, dated May 31, 2019, date of filing, Feb. 13, 2019, 13 pages.

(Continued)

*Primary Examiner* — Tuongminh N Pham
(74) *Attorney, Agent, or Firm* — Christopher J. Volkmann; Kelly, Holt & Christenson, PLLC

(57) ABSTRACT

An aerial paint spraying vehicle includes a body and a paint reservoir removably coupled to the body and configured to store paint. The aerial paint spraying vehicle includes a pressure vessel removably coupled to the body and configured to pressurize the paint from the paint reservoir. The aerial paint spraying vehicle includes a paint applicator assembly configured to receive the pressurized paint and expel the pressurized paint through a spray nozzle towards a target surface.

20 Claims, 11 Drawing Sheets

(56) References Cited

U.S. PATENT DOCUMENTS

| | | | |
|---|---|---|---|
| 2005/0150453 A1* | 7/2005 | Simmons | B05B 9/0833 |
| | | | 118/715 |
| 2006/0213048 A1* | 9/2006 | Kalanovic | B25J 17/0283 |
| | | | 29/468 |
| 2015/0274294 A1 | 10/2015 | Dahlstrom | |
| 2015/0344136 A1 | 12/2015 | Dahlstrom | |
| 2016/0082460 A1 | 3/2016 | McMaster et al. | |
| 2016/0355258 A1 | 12/2016 | Williams et al. | |
| 2019/0127064 A1 | 5/2019 | Beardsley et al. | |
| 2019/0366375 A1* | 12/2019 | Thompson | B64C 39/024 |

FOREIGN PATENT DOCUMENTS

| | | |
|---|---|---|
| WO | WO 2018136498 A1 | 7/2018 |
| WO | WO 2018136499 A1 | 7/2018 |

OTHER PUBLICATIONS

International Preliminary Report on Patentability for International Application No. PCT/US2019/017834, dated Aug. 27, 2020, filing date of: Feb. 13, 2019, 10 pages.

* cited by examiner

AERIAL FLUID SPRAYING SYSTEM

CROSS-REFERENCE TO RELATED APPLICATION

The present application is based on and claims the benefit of U.S. provisional patent application Ser. No. 62/631,110, filed Feb. 15, 2018, the content of which is hereby incorporated by reference in its entirety.

BACKGROUND

Aerial vehicles, such as unmanned aerial vehicles (UAV) or aerial drones, for example, often employ a number of rotors to provide lift and maintain stability in various environments. A computing system can control the rotors to pitch, yaw, roll and move the aerial vehicle in various directions. UAVs can be controlled remotely by a user and/or can be autonomously by a computing system.

The discussion above is merely provided for general background information and is not intended to be used as an aid in determining the scope of the claimed subject matter. The claimed subject matter is not limited to implementations that solve any or all disadvantages noted in the background.

SUMMARY

An aerial paint spraying vehicle includes a body and a paint reservoir removably coupled to the body and configured to store paint. The aerial paint spraying vehicle includes a pressure vessel removably coupled to the body and configured to pressurize the paint from the paint reservoir. The aerial paint spraying vehicle includes a paint applicator assembly configured to receive the pressurized paint and expel the pressurized paint through a spray nozzle towards a target surface.

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

Aerial vehicle technology is an ever-growing field. Aerial vehicles, for example, often employ a number of rotors to provide lift and maintain stability in various environments. A computing system can control the rotors to pitch, yaw, roll and move in various directions. Aerial vehicles can be controlled remotely by a user or autonomously by a control/computing system that can tightly follow a flight path. By attaching a paint sprayer to an autonomous aerial vehicle and designing a certain flight path along a surface, the aerial vehicle can autonomously paint the surface. In some instances, the aerial vehicle includes sensors, such as a camera, to distinguish areas to spray (e.g., a target surface, graffiti, rust, etc.) from areas that are not to be sprayed (e.g., windows, light fixtures, etc.).

Some implementations mount a spraying system onto an aerial vehicle using tethers to supply fluid and pressure to the aerial vehicle-mounted spraying system. However, the use of a tether decreases mobility, increases the moment of inertia and negatively affects the ability to spray with accuracy.

An example mobile spraying system described herein includes a fluid vessel and a pressure vessel on board the aerial vehicle. The fluid and pressure vessels include lightweight materials which greatly increase the mobility of the aerial vehicle.

Figure 1:
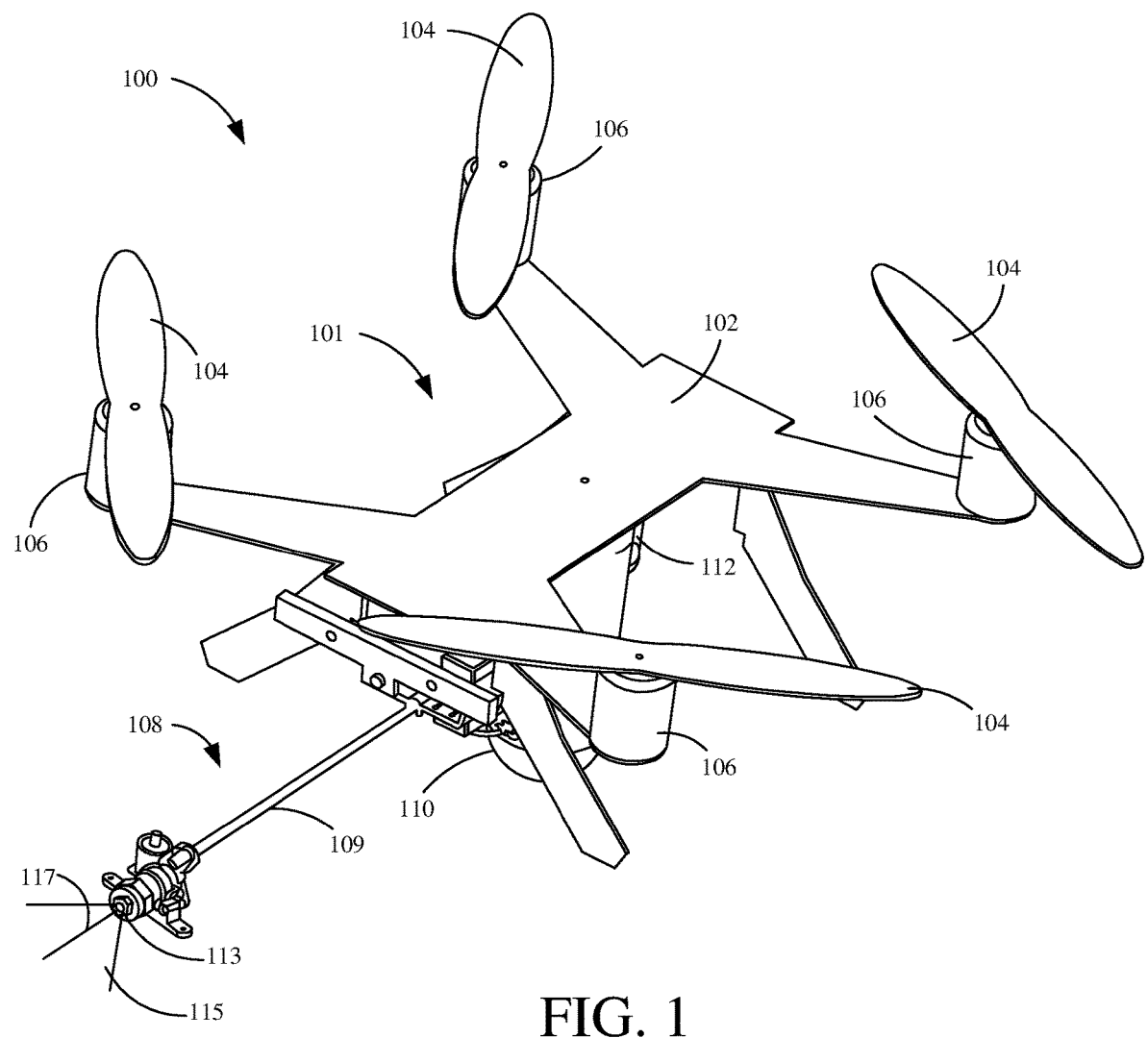
FIG. 1 is a perspective view showing an example mobile spraying system.

FIG. 1 is a perspective view showing an example mobile spraying system 100 including an aerial vehicle 101. Vehicle 101 includes, in the example, an unmanned aerial vehicle (UAV) or aerial drone. Vehicle 101 includes a body 102 that couples to rotors 104 through motor 106. Motors 106 are coupled to body 102 and power rotors 104 such that rotation of rotors 104 create lift and lift body 102 from the ground. While vehicle 101 comprises four rotors 104, vehicle 101 can comprise more or less rotors 104 depending on the application. Each rotor spins at varying speeds and directions as is known to counter rotation forces exerted by the other spinning rotors. Increasing or decreasing the rotational speeds of select rotors enables controllable movement of the aerial vehicle. For example, increasing rotational speeds on a given side, tilts the overall system and causes the aerial vehicle to move. As another example, increasing rotational speeds of select rotors rotates or yaws the aerial vehicle.

Mobile spraying system 100 also includes fluid applicator assembly 108 that applies a fluid (e.g., paint) to a target surface (e.g., a wall). Fluid applicator assembly 108, includes a supply rod 109, which, in one example, includes a light weight carbon fiber tube or some other tube capable of delivering fluid. The fluid flows through supply rod 109 to a nozzle assembly 111 having a spray nozzle 113 configured to emit a spray pattern 115 (e.g., a fan-shaped spray pattern) defined by a spray axis 117 of spray nozzle 113. The fluid applied by fluid applicator assembly 108 is stored in a fluid reservoir 110 that is coupled to body 102. A pressure supply 112 is also coupled to, or otherwise carried by, body 102 and configured to pressurize the fluid through fluid applicator assembly 108, to atomize and apply the fluid to the target surface.

As shown, fluid reservoir 110 includes a vessel pressurized by pressure supply 112. In other examples, fluid can be supplied to mobile spraying system 100 in other ways as well such as a pump and/or tether. As shown, pressure supply 112 includes a vessel containing a liquified gas. However, in other examples, pressure supply 112 can be a different source of pressure as well (e.g., a pump, a tether, a compressed gas, etc.).

Figure 2:
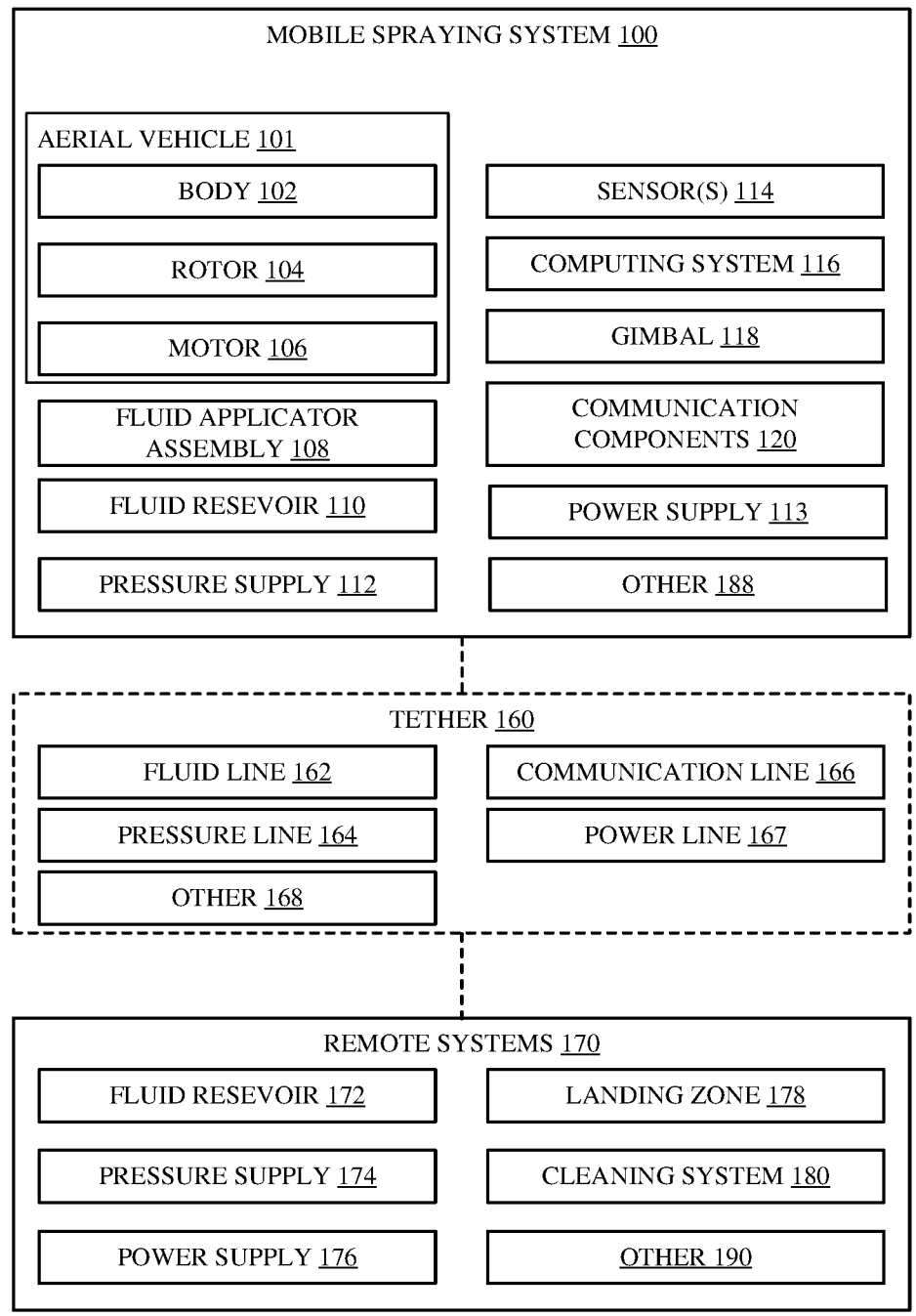
FIG. 2 is a block diagram showing an example mobile spraying system.

FIG. 2 is a block diagram of example mobile spraying system 100 in an operational environment 10. Mobile spraying system 100, as shown, includes an aerial vehicle 101 having body 102. Body 102 includes the base, frame and/or other structural components of mobile spraying system 100 that described components are mounted to or otherwise carried by. Body 102 can include lightweight elements components comprised of materials such as carbon fiber, aircraft aluminum alloys, etc. Body 102 can also be a skeletal structure having a plurality of voids to lighten the overall weight of mobile spraying system 100.

Motors 106 generate the rotational movement to drive rotors 104 which create lift and other rotational forces to control the movement of mobile spraying system 100. Motors 106 and rotors 104 can comprise lightweight materials to lighten the overall weight of mobile spraying system 100. For example, motors 106 could include motors with a high thrust to weight ratio and/or rotors could include carbon fiber or other lightweight materials.

Mobile spraying system 100 includes fluid applicator assembly 108 that applies the fluid to the target surface. Fluid applicator assembly 108 can be selectively engaged to spray fluid by computing system 116. For instance, when mobile spraying system 100 is over a first portion of the target surface, fluid applicator assembly 108 can be activated to spray the fluid and when mobile spraying system 100 is over a second portion of the target surface, or other undesired surface (e.g., a window), computing system 116 can deactivate the spray of fluid applicator assembly 108.

Some spraying applications, such as conventional paint spray guns, rely on a needle valve that requires a significant force to actuate, and to remain actuated. In one example, fluid applicator assembly 108 uses a valve configuration that requires less force to actuate, resulting in a smaller motor for valve actuation which lightens the load of mobile spraying system 100. Such valve configuration examples are described later with respect to FIG. 6A-6B.

Fluid applicator assembly 108 or parts thereof can be mounted directly or indirectly to body 102 via gimbal 118. Gimbal 118 allows movement of fluid applicator assembly 108 or parts thereof (e.g., the nozzle) about one or more axes. In one example, gimbal 118 allows the spray axis 115 of spray nozzle 113 to rotate about a plurality of axes 117, 119, and 121. This way, when mobile spraying system 100 moves (e.g., typical quadcopters use tilt to move laterally) gimbal 118 is operated (e.g., automatically) to keep fluid applicator assembly 108 at a desired orientation relative to the target surface which creates more consistent fluid coverage on the target surface. Gimbal 118 can also be used to adjust the location of the spray force vector relative to the center of gravity and/or the center of lift to increase or eliminate any rotational forces on the mobile spraying system 100 when spraying. For example, gimbal 118 can orient fluid applicator assembly 108 such that the reactive force vector aligns with the center of gravity of mobile spraying system 100.

Fluid reservoir 110 and/or pressure supply 112 are also coupled directly or indirectly to body 102. Fluid reservoir 110 includes a vessel that stores a given amount of fluid. For example, fluid reservoir 110 includes a carbon fiber tank, plastic or other lightweight vessel that can be removably coupled to mobile spraying system 100, such that it may be removed and replaced with another reservoir when expended.

Pressure supply 112 can include a vessel containing pressurized or and/or liquid-state gases (e.g., carbon dioxide, nitrous oxide, nitrogen, hydrocarbons, fluorocarbons, ethers, etc.). For instance, pressure supply 112 includes a carbon fiber other lightweight tank that is coupled to fluid reservoir 110 and provides pressure to fluid in fluid reservoir 110 (with or without mixing with the fluid) towards fluid applicator assembly 108. Pressure supply 112 can be removably coupled to mobile spraying system 100 for an exchange to replenish the pressure of mobile spraying system 100. For instance, pressure supply 112 includes a vessel having a threaded connection mechanism that removably couples, and provides a fluid connection between, pressure supply 112 and mobile spraying system 100.

In some examples, pressure supply 112 is a pump that pumps the fluid from fluid reservoir 110 to fluid applicator assembly 108. Pressure supply 112 can provide either high pressure or low pressure as needed by the specific application.

Mobile spraying system 100 also includes a power supply 113. Power supply 113 supplies power to the various components of mobile spraying system 100. Power supply 113, in some examples, includes a battery that is removably coupled to mobile spraying system 100, such that the battery can be removed and replaced with a new battery to resupply power to the components of mobile spraying system 100. For example, power supply 113 includes a rechargeable lithium-based battery that provides power to motors 106, pressure supply 112 and other components of mobile spraying system 100.

Mobile spraying system 100 includes one or more sensor(s) 114. Sensors 114 can include a variety of sensors that allow for control of motion of mobile spraying system 100 and spraying of fluid applicator assembly 108. For example, sensors 114 can include gyroscopes, accelerometers, motor temperature sensors, rotor speed sensors, to precisely control flight of aerial vehicle 101 and fluid pressure sensors, spray pattern sensors, image sensors, fluid flow sensors to precisely control the spraying operation of fluid applicator assembly 108. Sensors 114 can include position sensors such as laser based, ultrasonic based, camera-based position sensors, etc. to aid in the control of the flying and spraying operations. In some examples, sensors 114 include a camera that can distinguish between areas to spray (e.g., an unobstructed portion of the target surface, graffiti, rust, etc.) and areas to avoid spraying (e.g., windows, doors, trim, light fixtures, etc.).

Computing system 116 can include one or more hardware components (e.g., microprocessors), firmware components, and/or software components, etc. that control a variety of operations of mobile spraying system 100. For example, computing system 116, acting as a control system, receives sensor signals from one or more sensors 114 (e.g., IMU, gyroscope, accelerometer, etc.) and controls the output of motors 106 to move with stability through the air. Computing system 116 can also complete analytical operations as well such as fluid application rate, spray pattern analysis, etc. For example, computing system 116 can receive fluid flow rates from a fluid sensor 114 and motion data from accelerometers/gyroscopes/IMU's and calculate the thickness of the fluid being applied to the target surface. As another example, computing system 116 can receive data from a sensor, (e.g., a camera), and distinguish, based on the data (e.g., image or video), which areas need or should be sprayed, and which should not be sprayed. As another example, computing system 116 includes software having feature detection, smoothing, edge detection, functions. In some examples, software of computing system 116 uses the GPS, laser range finder, feature detection in conjunction to accurately detect the relative location of the drone. In some examples, the software can also employ the GPS, laser range finder, feature detection to spatially map the area of paint sprayed. In some examples, the area of the paint sprayed is triangulated in the software and used along with the information of gallons sprayed and time sprayed to give an average coating thickness.

In one example, computing system 116 includes software that uses the gyroscope, accelerometers, inertial motion sensors in the gimble, along with information from laser range finder, stereo vision, GPS, to accurately predict the location of the drone.

Mobile spraying system 100 also includes communication components 120 that allow for communication of data from mobile spraying system 100 to another device or system (e.g., remote systems 170). For example, mobile spraying system 100 can connect to a smart phone or other mobile device and update a user on the fluid coverage thickness, fluid application rate, fluid coverage area, total fluid expended, low pressure, low fluid stores, etc.

In some examples, mobile spraying system 100 communicates with other mobile spraying systems 100 via communication components 120 and the plurality of mobile spraying systems 100 apply fluid to the target surface in conjunction with one another. For example, a first mobile spraying system 100 applies fluid to a first area of the target surface, then while the first mobile spraying system 100 is refueling/resupplying, a second mobile spraying system 100 applies fluid to a second area of the target surface and the process repeats with the first mobile spraying system 100 spraying while the second mobile spraying system 100 refuels or resupplies. Of course, there can be more than two mobile spraying systems 100 applying fluid to a target surface as well. For instance, a plurality of mobile spraying systems 100 that are reduced in size and fluid/pressure holding capacity can create an agile hive-like fleet when applying fluid to a surface.

Mobile spraying system 100 can include other items as well, as indicated by block 188.

In some examples, mobile spraying system 100 is coupled to a remote system 170 via tether 160. Tether 160, as shown, includes a fluid line 162, pressure line 164, communication line 166, power line 167 and can include other components as well, as indicated by block 168.

Fluid line 162 supplies fluid from a source (e.g. fluid reservoir 172 of remote systems 170) to mobile spraying system 100. Pressure line 164 supplies a pressure to mobile spraying system 100 from a pressure source of (e.g., pressure supply 174 of remote systems 170). Communication line 166 can allow for wired communications between mobile spraying system 100 and another device or system (e.g. remote system 170 or another mobile spraying system 100). Power line 167 can supply electric power from a source (e.g., power supply 176) to mobile spraying system 100. In some examples, another aerial vehicle couples to tether 160 to support the weight of tether 160 and reduce the effect of tether 160 on the flight maneuverability of mobile spraying system 100. Tether 160 can include other items such as sheathing to protect the various lines or and/or attachments that allow another flying system to carry the weight of tether 160 such that the mobile spraying system 100 does not drag the weight of tether 160.

Remote systems 170, as shown, includes fluid reservoir 172, pressure supply 174, power supply 176, landing zone 178, cleaning system 180 and can include other items as well, as indicated by block 190.

Fluid reservoir 172 can include a reservoir(s) and/or vessel(s) that contain an amount of fluid. For example, fluid reservoir 172 can be an area containing a plurality of fluid reservoirs 110 that can replace the fluid reservoir 110 coupled to the mobile spraying system 100. In addition, or alternatively, fluid reservoir 172 includes a reservoir and a refueling mechanism that fills the fluid reservoir 110 on mobile spraying system 100.

Pressure supply 174 can provide pressure to mobile spraying system 100. In one example, pressure supply 174 include a reservoir(s) or vessel(s) that contain pressure (e.g., a compressed gas, liquified gas, etc.). For example, pressure supply 174 can be an area containing a plurality of pressure supplies 112 that can replace the pressure supply 112 coupled to the mobile spraying system 100. In addition, or alternatively, pressure supply 174 includes a reservoir and a refueling mechanism that fills the pressure supply 112 on mobile spraying system 100. In addition, or alternatively, pressure supply 174 includes a pump that generates the pressure supplied to mobile spraying system 100.

Power supply 176 can provide electric power to mobile spraying system 100. In one example, power supply 176 includes a plurality of power supplies 113, which in some instances, include batteries. The plurality of power supplies 113 stored in power supply 176 can be interchanged with the power supply 113 on the mobile spraying system 100. Power supply 176 can also provide other functions, for example, power supply 176 can recharge the battery on mobile spraying system 100 or recharge the batteries located within power supply 176.

Landing zone 178 can include a surface for mobile spraying system 100 to land and in some cases, removably couple to. Cleaning system 180 can include a variety of devices to clean the mobile spraying system 100. For example, cleaning system 180 can include an area where fluid applicator assembly 108 can purge its nozzle without the spray going into an undesired area. As another example, cleaning system 180 can clean the rotors 104, motors 106, etc. of accumulated fluid from overspray.

Figure 3A:
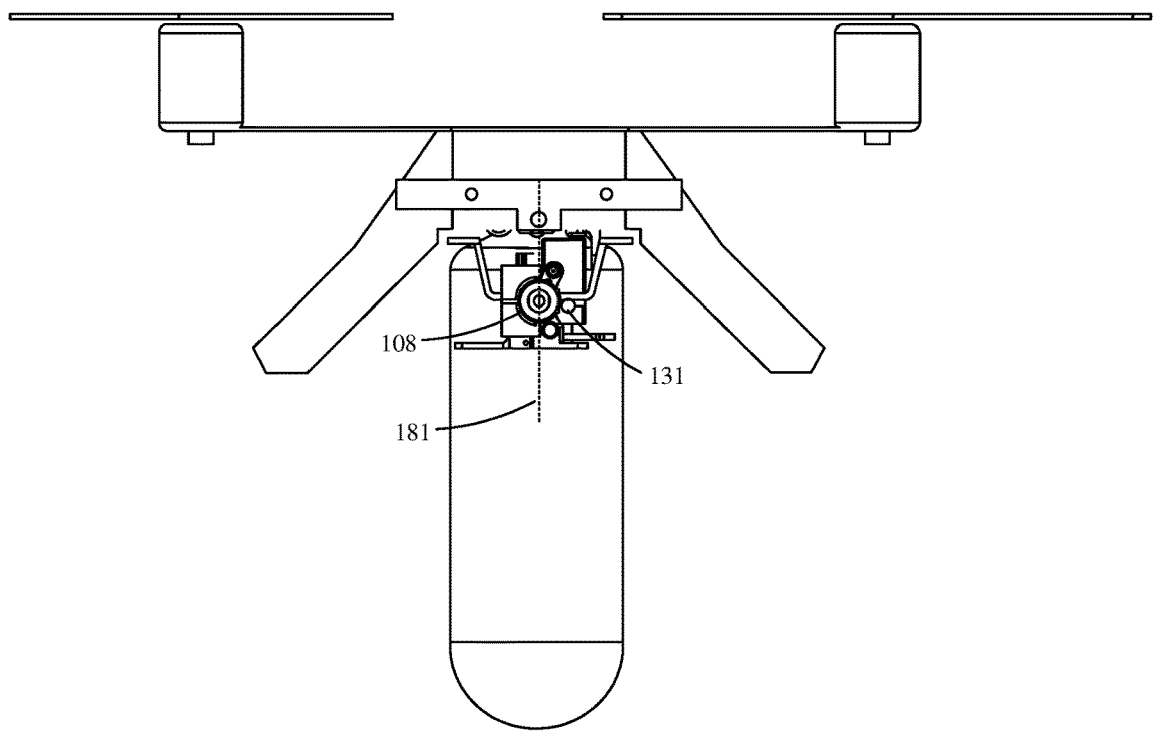
FIGS. 3A and 3B are front views showing an example mobile spraying system.
Figure 3B:
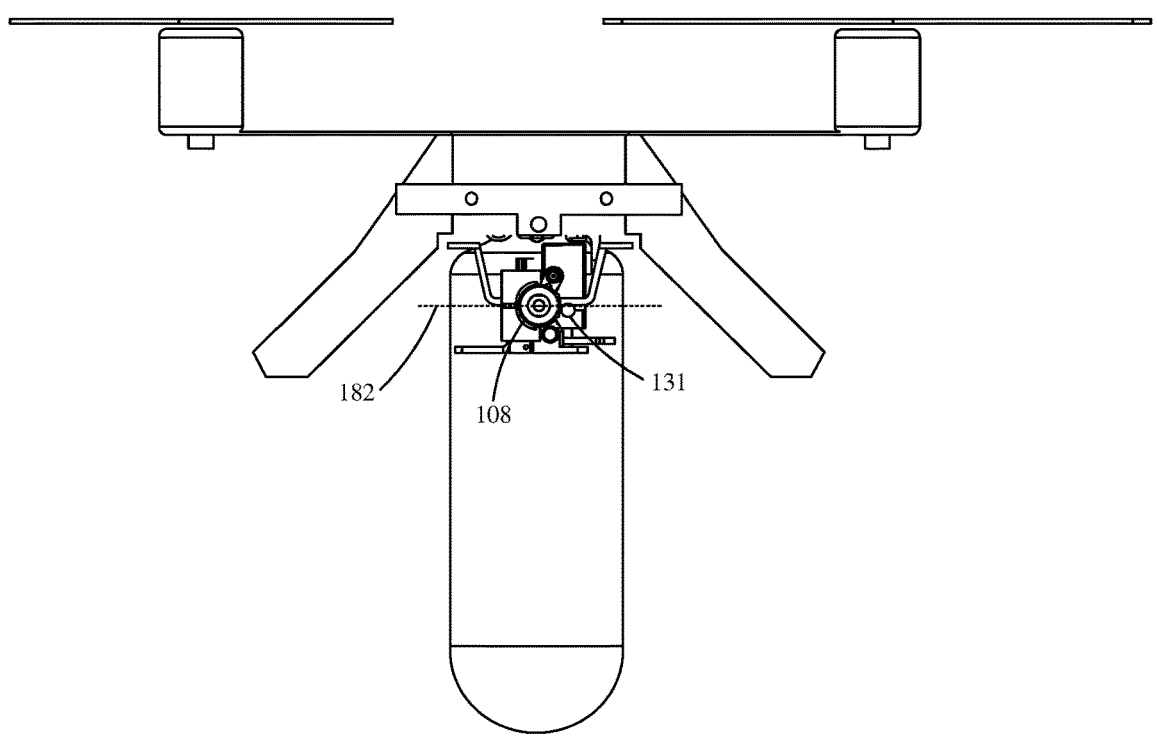

FIGS. 3A and 3B are front views showing mobile spraying system 100 during operation, in one example. In FIG. 3A, fluid applicator assembly 108 (or parts thereof, referred to as fluid applicator assembly 108 hereinafter with respect to FIGS. 3A-3B) extend from mobile spraying system 100 and is oriented as to produce a spray fan 181 that is generally perpendicular to the ground. This orientation of fluid applicator assembly 108 and spray fan 181 is typically used when mobile spraying system 100 is moving laterally along a target surface. For example, when mobile spraying system 100 moves from one edge of a target surface to another without changing altitude, spray fan 181 can be used. Actuator 131 can be mounted to mobile spraying system 100 to rotate fluid applicator assembly 108 from one orientation to another (e.g., from the orientation of FIG. 3A to the orientation of FIG. 3B). In some examples, actuator 131 rotates only the tip or nozzle of fluid applicator assembly 108.

In FIG. 3B, fluid applicator assembly 108 extends from mobile spraying system 100 and is oriented as to produce a spray fan 182 that is generally parallel to the ground. This orientation of fluid applicator assembly 108 and spray fan 182 is typically used when mobile spraying system 100 is moving vertically along a target surface. For example, when mobile spraying system 100 changes altitude without moving laterally relative to a target surface, spray fan 182 can be used.

Of course, orientations of spray fans 181 and 182 are only examples and other orientations of fluid applicator assembly 108 can be used. For example, when painting a gable of a house it may be useful to orient fluid applicator assembly 108 perpendicular to the pitch of the roof as mobile spraying system 100 navigates along the roof line. In some examples, actuator 131 automatically maintains a spray fan orientation that is perpendicular relative to the direction of movement of mobile spraying system 100. Actuator 131, as shown, is a servo motor, however, in other examples actuator 131 can be a different type of actuator as well, such as a stepper motor, etc.

Figure 4:
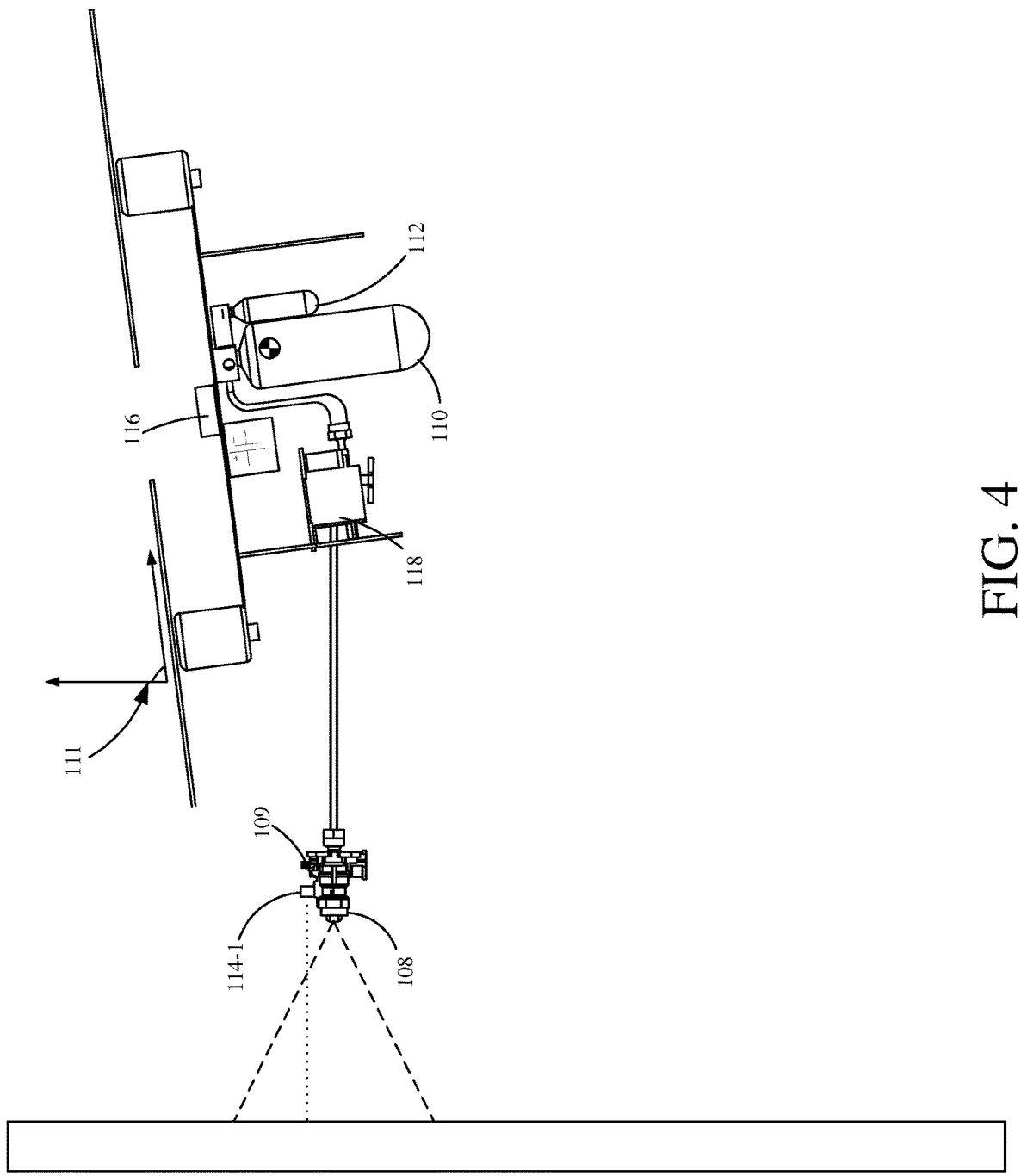
FIG. 4 is a side view showing an example mobile spraying system during operation.

FIG. 4 is a side view showing mobile spraying system 100 during operation, in one example. During a spraying operation it is ideal that the fluid applicator assembly 108 remains a given distance from the target surface being covered to maintain uniform fluid coverage. In order to remain at a given distance from the target surface, mobile spraying system 100 must counteract the reactive force generated by the fluid being expelled from fluid applicator assembly 108. Typically to counteract a force, such as wind, mobile spraying system 100 will tilt at a given angle 111 and the non-vertical component of the force generated by the tilted rotors 104 will counteract the force. In one example, counteraction of the fluid applicator assembly 108 reactive force includes calculating the reactive force and adjusting the angle 111 and force vector of the rotors 104, such that the cosine of angle 111 multiplied by the force vector of the rotors 104 equals the force generated by fluid applicator assembly 108. Absent other factors (e.g., wind, rotor damage, center of mass shifts, etc.), this adjustment should result in a zero-net acceleration of mobile spraying system 100. Since the rotors 104 and fluid applicator assembly 108 force vectors do not necessarily align with the center of mass 115, more advanced calculations may be needed to prevent mobile spraying system 100 from rotating under the given forces.

In the absence of a counteractive force, the reactive force generated by fluid applicator assembly 108 would result in mobile spraying system 100 accelerating away or drifting from the target surface being covered. In some examples, monitoring any potential drift from the target surface (which can be corrected in substantially real-time) is completed by sensor 114-1 which is mounted on mobile spraying system 100 to sense and/or calculate the distance from the target surface. Sensor 114-1 can be ultrasonic, laser-based, image, stereo-image or other distance sensors. Sensor 114-1 can also sense in conjunction with IMU's, gyroscopes, accelerometers, etc. mounted on mobile spraying system 100 to better ensure a correct distance measurement. For example, an image system can miscalculate a distance based on visual obscurants which may result in a system mis-correction towards or away from the target surface, to mitigate this mis-correction risk, the distance measurement from the image system could be checked by an accelerometer on the mobile spraying system 100 for accuracy before the correction is made.

Figure 5:
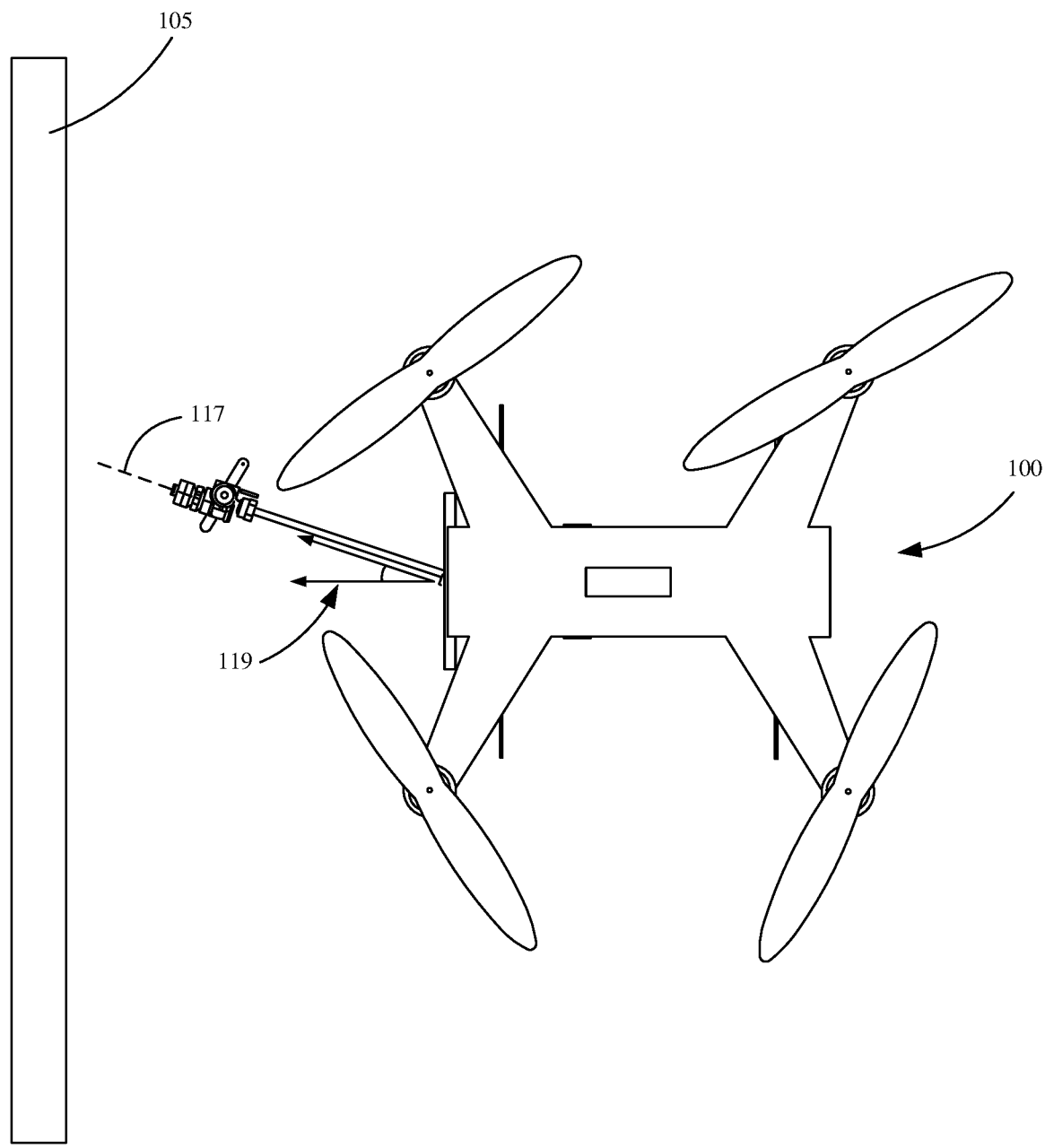
FIG. 5 is a top view showing an example mobile spraying system during operation.

FIG. 5 is a top view showing mobile spraying system 100 during operation, in one example. As shown, fluid applicator assembly 108 is coupled to mobile spraying system 100 at an angle 119. As shown, angle is non-perpendicular with respect to the target surface and as such when fluid is expelled from nozzle 113 of fluid applicator assembly 108, a reactive force opposite the expulsion of fluid will generate a vector with some amount of force going in a direction parallel to the target surface. Mobile spraying system 100, in this case, counteracts the perpendicular forces (e.g. approximately equal to the cosine of angle 117) and utilizes the parallel forces (e.g., approximately the sine of angle 117) to drive lateral movement of mobile spraying system 100. Utilizing these parallel forces can save battery life needed to propel mobile spraying system 100 along a length of the wall with minimally affecting the coverage on target surface 105. In other examples, fluid applicator assembly 108 can be angled in a different direction and its force utilized for movement also. For example, fluid applicator assembly 108 can be pointed at an angle towards the ground and some of the reactive force can be utilized for lift.

Figure 6A:
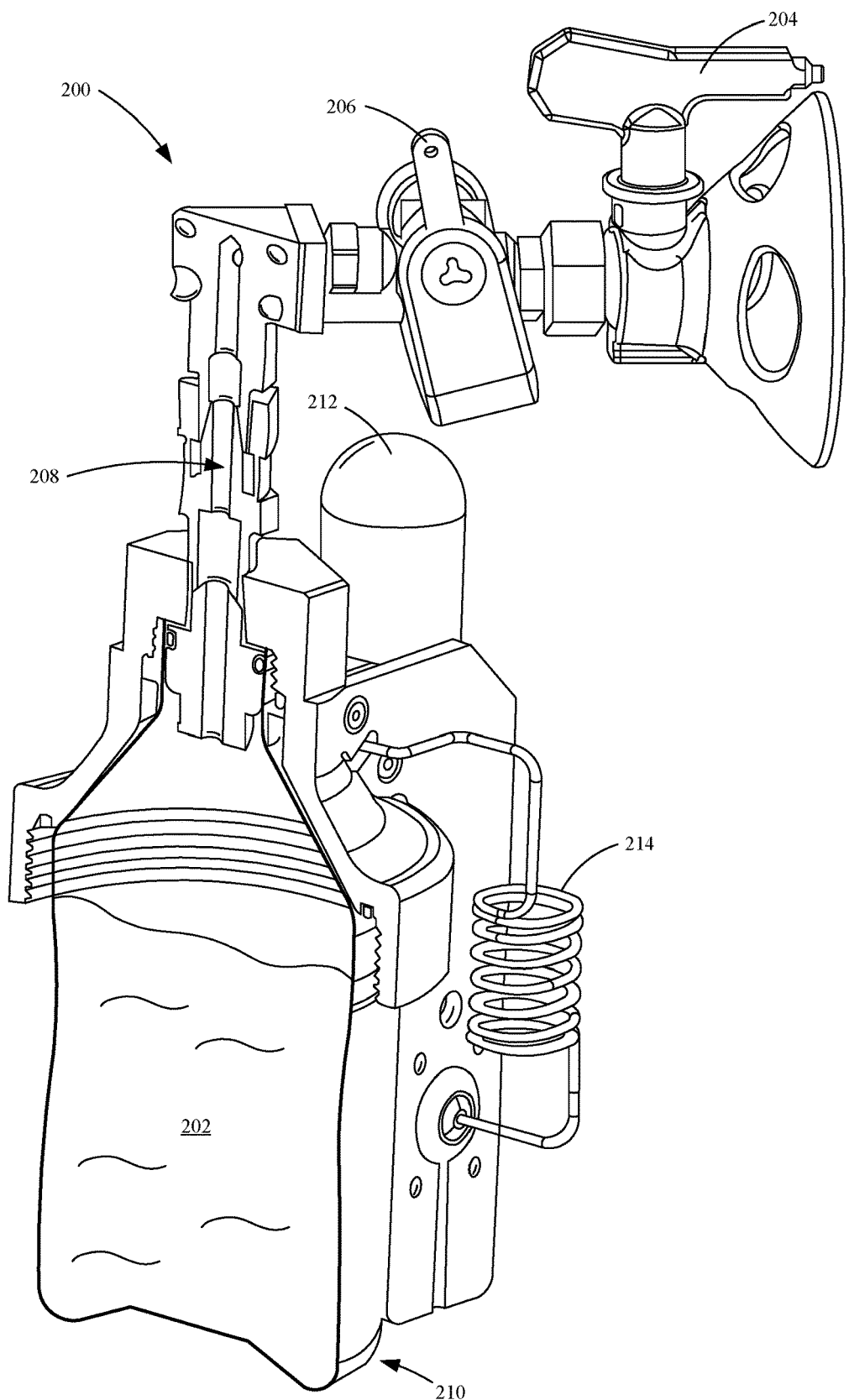
FIG. 6A is a partial sectional view showing an example fluid applicator.

FIG. 6A is a partial sectional view showing an example applicator 200. Applicator 200 can, for example, be mounted to mobile spraying system 100 in place of fluid applicator assembly 108. Applicator 200 contains fluid 202 that is atomized and applied to a target surface by way of nozzle 204. Fluid 202 is contained in vessel 210 and when pressurized flows through fluid path 208 towards valve 206. Valve 206 as shown is a low force actuation valve that requires a smaller actuator (e.g., a servo motor) to actuate than a traditional needle valve. One example valve includes a valve housing that allows a pressurized fluid to come into contact with a forward end portion of the valve assembly. The forward end portion is the end where the valve assembly seats to make a seal. The pressurized fluid counters a pressure placed on a rear end portion as the pressurized fluid is dispersed through the valve or applicator outlet. The rear end is the end where the fluid enters the valve housing and contacts the valve assembly. In this example, equal pressure (or at least a more similar pressure) is then placed on both sides of the valve assembly within the valve housing, which eliminates a pressure force acting to maintain valve assembly in an open position. By effectively reducing or eliminating the pressure holding the valve assembly in the open position, there is no need for a strong spring, which, in turn, reduces the size of an actuator to hold the applicator valve in the open position. One example valve is described in U.S. patent application Ser. No. 15/704,670, filed Sep. 12, 2017, the content of which is hereby incorporated by reference in its entirety.

Fluid 202 can be pressurized by mixing with a fluid (e.g., pressurized gas, liquified gas, etc.) from pressure vessel 212. Alternatively, fluid 202 can be pressurized by pressure vessel 212 without mixing with the contents of pressure vessel 212, such as with the use of a fluid bag or piston in vessel 210. In some examples, as fluid 202 and pressure from pressure vessel 212 are expended, the center of gravity of applicator 200 does not change (e.g., a double piston system is used within vessel 210). Additionally, a dampening system within vessel 210, such as a bag or piston, can be utilized to prevent the fluid from sloshing and affecting the flight of an aerial vehicle the applicator 200 is mounted on.

Figure 6B:
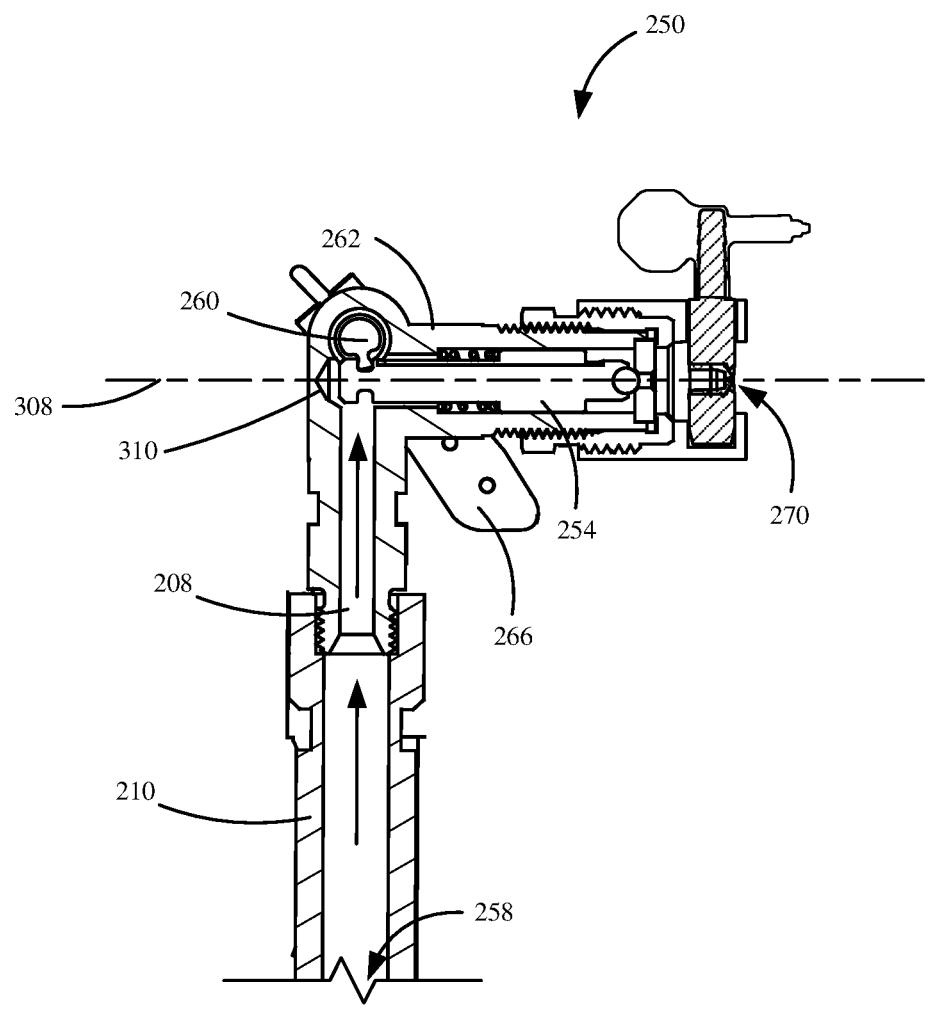
FIG. 6B is a sectional view showing the example fluid applicator.

FIG. 6B is a sectional view showing an example applicator 250. Applicator 250 is similar to applicator 200 and, as such, includes components numbered similarly. As illustratively shown, applicator 250 is configured to receive pressurized fluid from a pressurized liquid source through inlet 258 of receiving portion 210. The pressurized fluid then travels along a flow path 208 through receiving portion 210 and body 262 and is configured to be dispersed through an outlet 270.

Applicator 250 includes a valve assembly 254 within body 262 configured to move between a first position and a second position. The first position of valve assembly 254, as illustratively shown, obstructs a dispersal of pressurized liquid from outlet 270 of applicator 250. Alternatively, moving valve assembly 254 to the second position includes moving valve assembly 254 laterally along axis 258 so that the pressurized fluid can be dispersed out of outlet 270 of applicator 250.

Valve assembly 254 is coupled to an actuating mechanism 260 within body 262 of applicator 250. Actuating mechanism 260 is configured to selectively move valve assembly 254 between the first and second positions based on an operator applying pressure to trigger 266, effectively moving trigger 266 from a non-actuated position, as illustratively shown, to an actuated position. In this example, trigger 266 is coupled to actuating mechanism 260 using a coupling mechanism.

In operation, upon applying a pressure to trigger 266, a force is subsequently generated and transferred through a coupling mechanism, to actuating mechanism 300. Upon receiving the force, actuating mechanism 260 moves valve assembly 254 from a first position to a second position in order for a pressurized fluid to be dispersed out of outlet 270. However, in order to maintain a dispersal of pressurized liquid, valve assembly 254 must remain in the second position. As a result, this requires a constant pressure from a user to maintain trigger 266 in an actuated position. However, over a course of a liquid application process, this may cause user fatigue in maintaining an applied pressure to trigger 266. Specifically, as a pressurized fluid travels along flow path 302 and is dispersed out of outlet 270, the pressurized fluid acts against a second end portion, or rear seal portion and, as such, requires an elevated amount of pressure from a user to counterbalance the spring force required to close the valve upon trigger release.

However, in accordance with an embodiment of the present invention, a configuration of flow path 302 allows for an alleviation of pressure required in maintaining valve assembly 304 in a second position, and thus, trigger 266 in an actuated position. For example, by receiving a pressurized liquid through inlet 108 located at a distal portion of applicator 250, the pressurized liquid is configured to travel through a rear portion of body 262 and come into contact with a second end portion of valve assembly 254. Further, the pressurized liquid can travel in notch 264 within body 262. By having a pressurized fluid come into contact with a second end portion of valve assembly 254, the pressurized fluid can counter a pressure placed on a first end portion, or obstruction portion, as the pressurized fluid is dispersed through outlet 270. In one example, an equal pressure is then placed on all sides of valve assembly 254 within the pressure vessel, which eliminates a pressure force acting to maintain valve assembly 254 in the second position. By effectively reducing or eliminating the pressure holding the valve assembly in the second, open, position, there is no need for a strong spring, which, in turn, reduces the size and weight of the actuator that actuates trigger 266.

Figure 7:
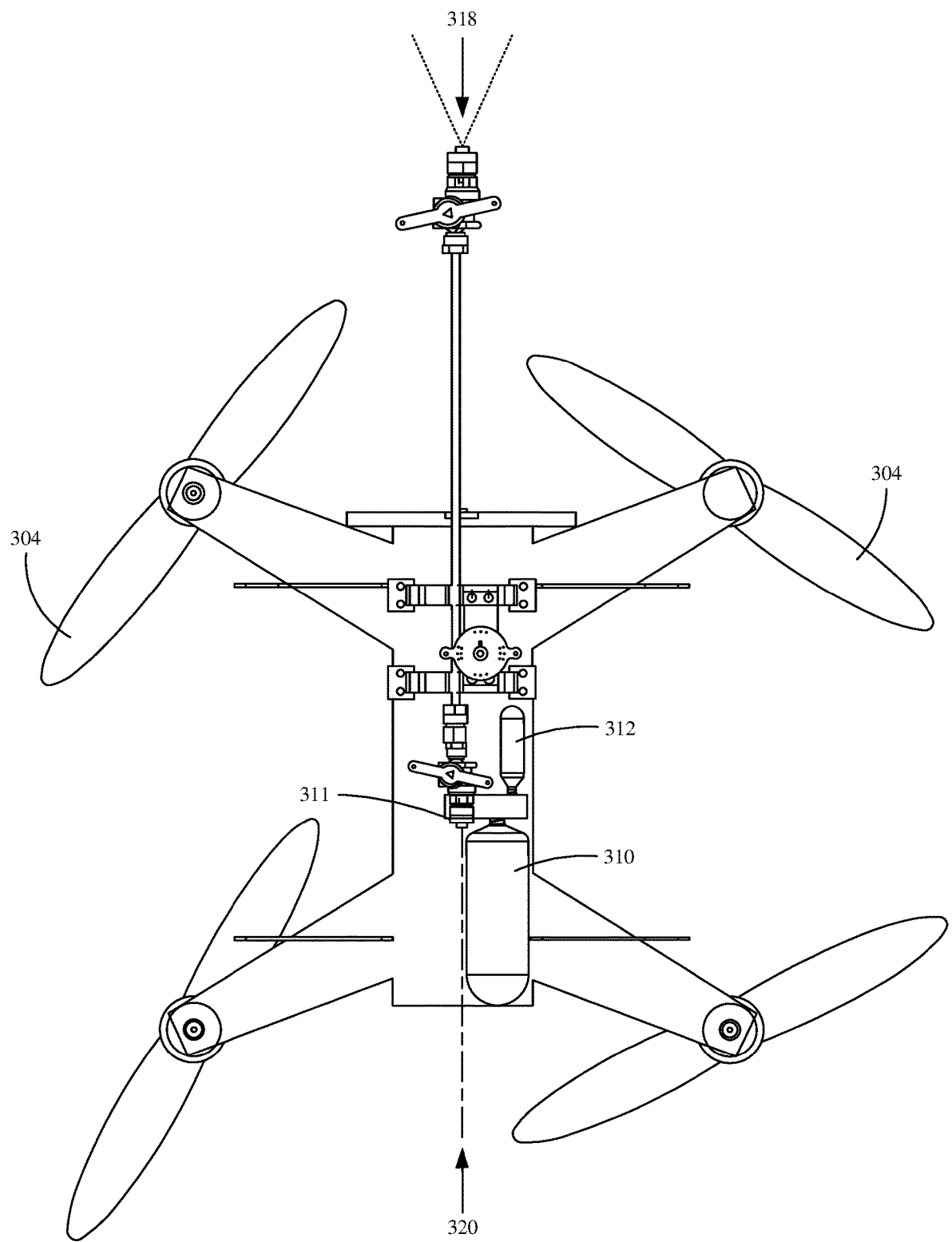
FIG. 7 is a bottom view showing an example mobile spraying system.

FIG. 7 is a bottom view showing an example mobile spraying system 300. As shown, mobile spraying system 300 includes rotors 304, applicator 308, fluid vessel 310 and a pressure vessel 312. Pressure vessel 312 provides pressure to fluid vessel 310 (or to the fluid at some point before being expelled) which allows fluid to be expelled through applicator 308, which in, turns generates a reactive force illustrated by arrow 318.

The force indicated by arrow 318 can be counteracted by providing a reactive jet nozzle 311 that generates a counteracting force which is indicated by arrow 320. This counteracting force indicated by arrow 320 counters out the application force indicated by arrow 318 and results in a zero-net acceleration from the spraying procedure and hence a more consistent distance between mobile spraying system 100 and the target surface when fluid applicator assembly 108 is actuated, which can result in more uniform fluid application. In some examples, instead of a zero-net acceleration, countering the application reactive force indicated by arrow 318 can mean reducing the net acceleration on mobile spraying system 100 and not necessarily reducing the net acceleration to zero.

As shown, reactive jet nozzle 311 includes a nozzle that expels a fluid and provides a jet force (e.g., which can be supplied via pressure vessel 312) equal to the spray force of applicator 308. As shown, applicator 308 and reactive jet nozzle 311 are mounted in a fixed arrangement on the same axis such that they always counteract one another, without generating rotational forces, even when gimbal 318 allows for varying movement of applicator 308. Reactive jet nozzle 311 can be replaced by another force generating device, such as a propeller. However, a propeller typically has more lag in generating a sustained force than a jet nozzle. In one example, reactive jet nozzle 311 creates a reactive force, such as the force indicated by arrow 320, simultaneously as applicator 308 begins spraying which generates the force indicated by arrow 318, such that mobile spraying machine 300 experiences minimal or zero net acceleration. In some examples, instead of countering a force, jet nozzle 311 creates a force that moves mobile spraying machine 300.

Figure 8A:
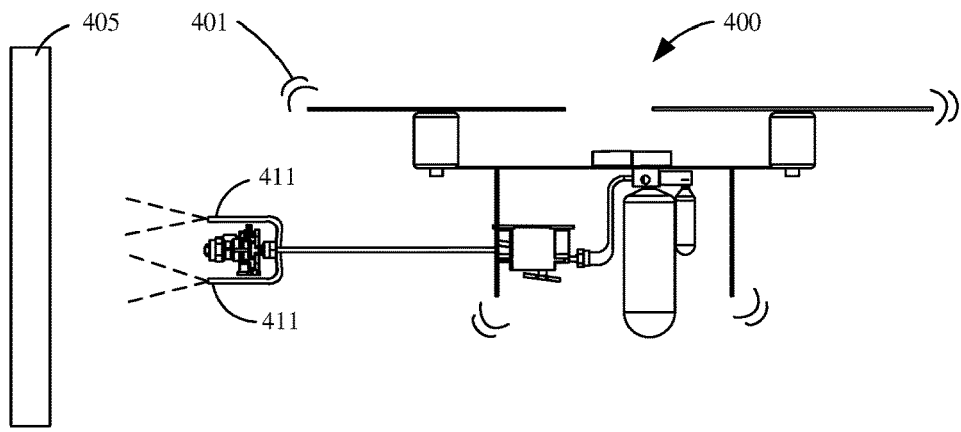
FIGS. 8A-8C are side views showing operation of an example mobile spraying system.
Figure 8B:
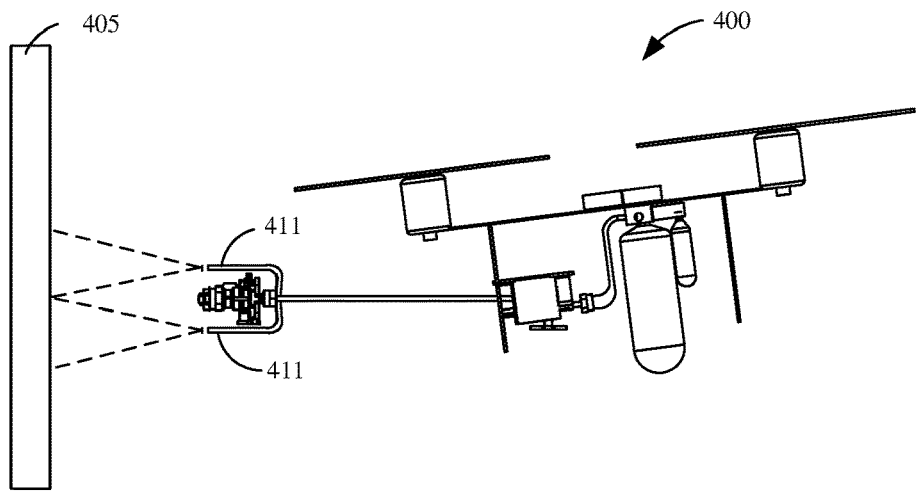
Figure 8C:
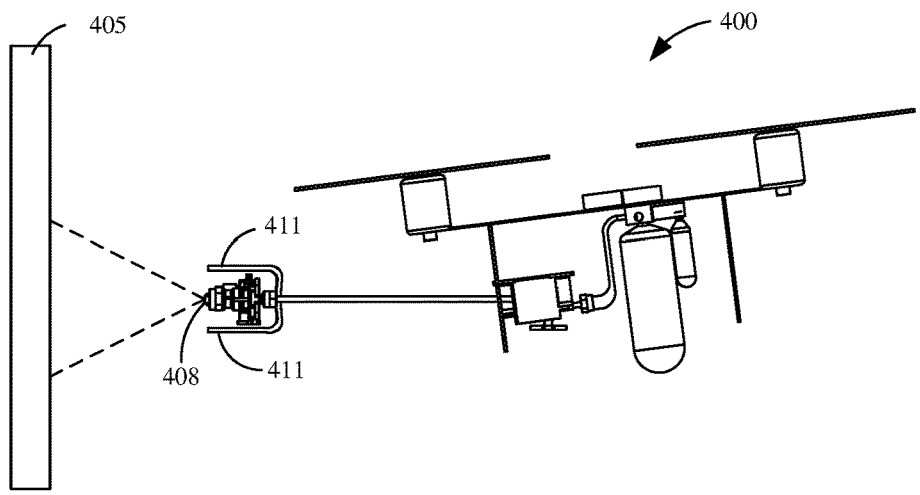
Figure 9:
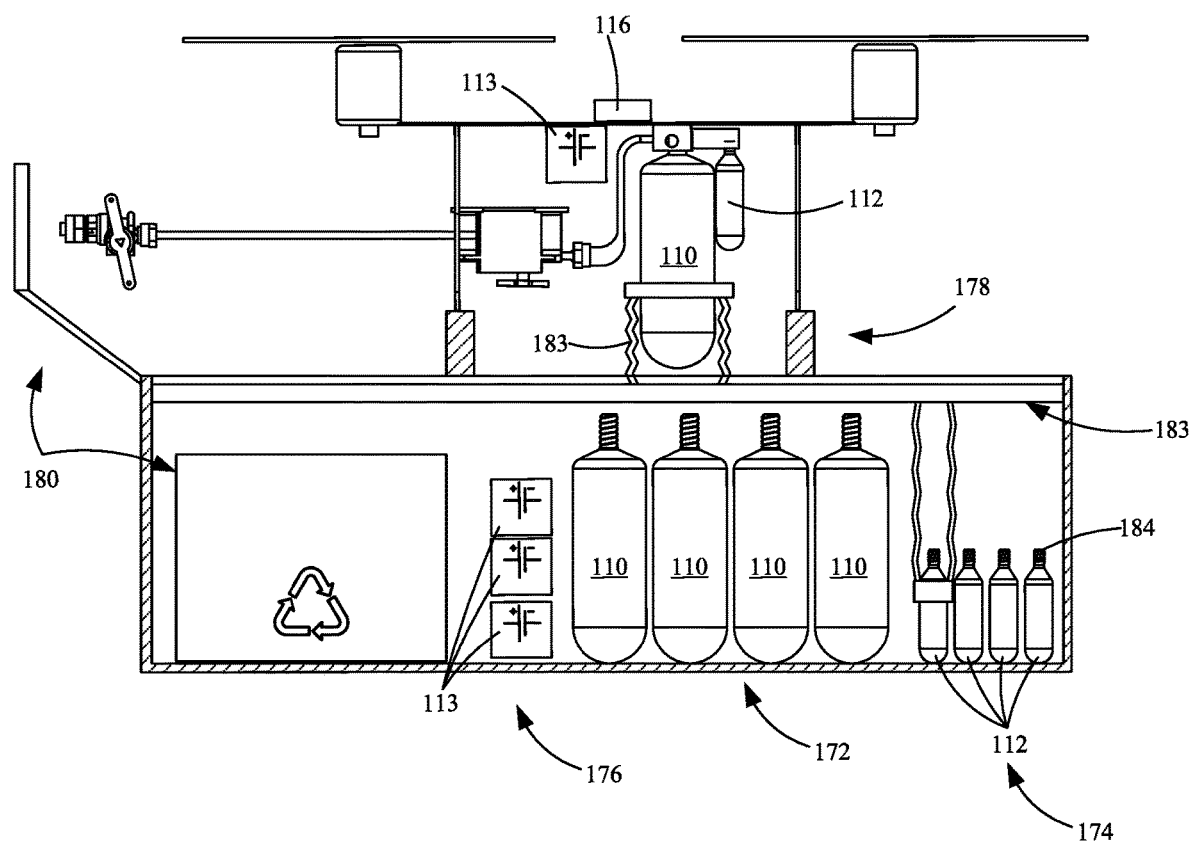
FIG. 9 is a side diagrammatic view of an example remote system.
Figure 10:
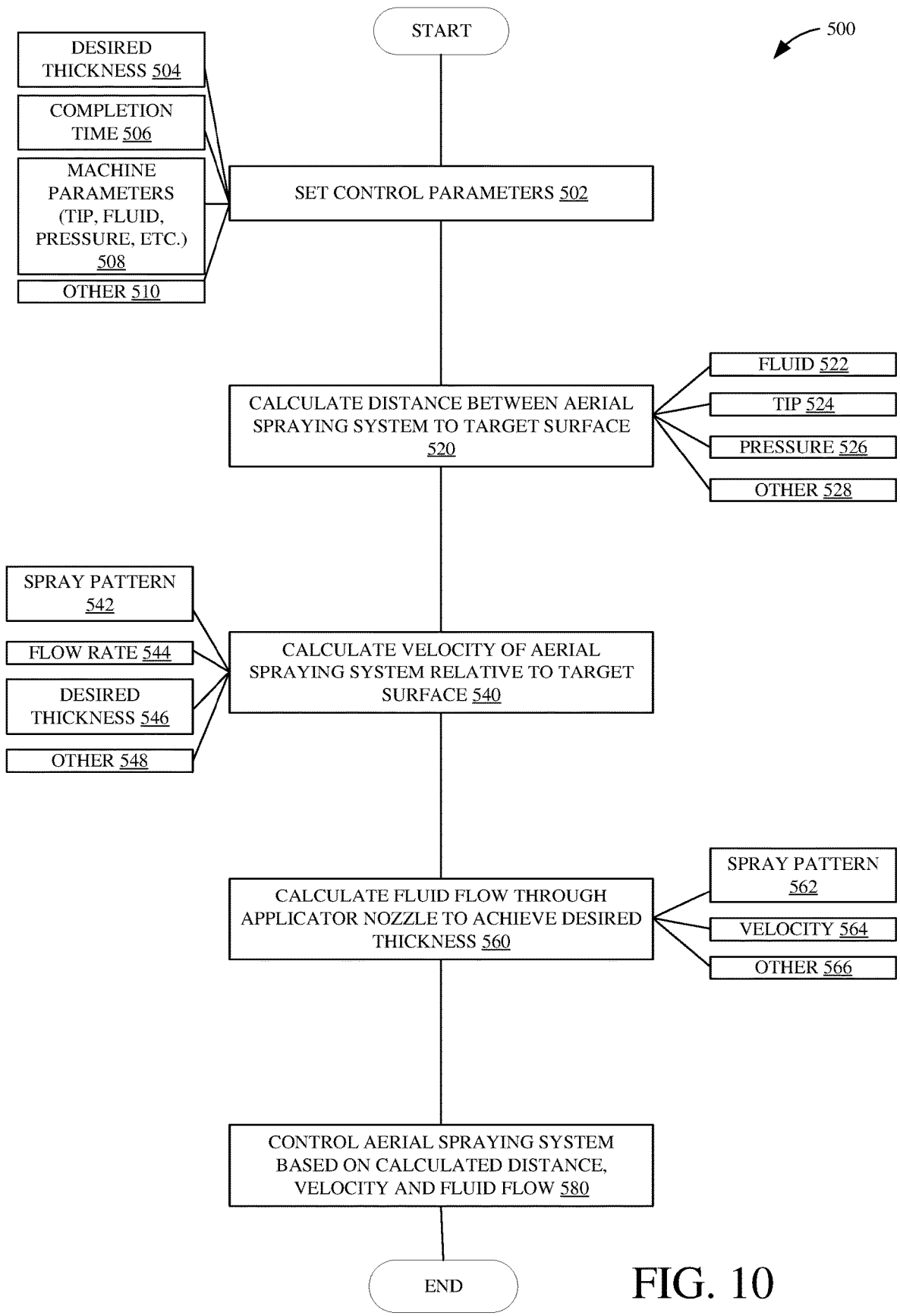
FIG. 10 is a flow diagram showing an example operation of a mobile spraying system.

A jolt is a typical stabilizing response to a system that has a new force applied on it, the response can manifest as a shake, or abrupt movement. Shortly after the new force is applied and the jolt occurs, the system stabilizes to a point with no motion. A jolt that occurs during a spraying operation may cause an abnormal paint pattern on the target surface, such as, a wave in an otherwise straight spray pattern. FIGS. 8A-C illustrate one example solution to the problem of jolting during initiation of a spraying operation.

FIGS. 8A-8C are side views showing operation of mobile spraying system 400. FIG. 8A is a side view showing actuation of preparatory nozzles 411. When preparatory nozzles 411 are first actuated they sends a jolt to the entire mobile spraying system 400 as indicated by motion lines 401. Preparatory nozzles 411, as shown, eject air or another pressurized gas that do not apply a fluid to target surface 405. Preparatory nozzles 411 emulate the same force on mobile spraying system 400 that will be enacted on the system by applicator 408 when it begins the spraying operation.

FIG. 8B shows is a side view showing mobile spraying system 400 shortly after actuation of preparatory nozzles 411. As shown, mobile spraying system 400 has stabilized and remains at relatively motionless relative to target surface 405 while preparatory nozzles 411 are still generating the spray force. Mobile spraying system 400 has also enacted measures to counteract the force created by preparatory nozzles 411, which as shown, is to tilt mobile spraying system 400 towards target surface 405. However, in other examples, a different measure to counteract the force could be used, such as the reactive force in FIG. 7.

FIG. 8C is a side view showing mobile spraying system 400 shortly after substantially instantaneously turning off preparatory nozzles 411 and beginning application by applicator 408. As shown, by instantaneously switching from one force source to another mobile spraying system 400 has remained substantially motionless relative to target surface 405 because the forces generated by preparatory nozzles 411 and applicator 408 are substantially the same and, effectively, mobile spraying system 400 does not have to re-adjust to a new force. Systems that do not have a mechanism for preparing and/or adjusting for a jolt of a newly applied force can cause an abnormal spray pattern on target surface 405, such as a wave or jitter in an otherwise straight spray pattern.

FIG. 9 is a side diagrammatic cutaway view of an example remote system 170. Remote systems 170 includes fluid reservoir 172, pressure supply 174, power supply 176, landing zone 178 and cleaning system 180. Mobile spraying system 100 lands at the example remote system 170 on landing zone 178. Once landed mobile spraying system 100 can be cleaned, have its power supply, fluid supply and pressure supply replenished before lifting off again to continue spraying.

Fluid reservoir 172 includes a reservoir(s) or vessel(s) that contain an amount of fluid. For example, fluid reservoir 172, as shown, includes an area containing a plurality of fluid reservoirs 110 that can replace the fluid reservoir 110 coupled to the mobile spraying system 100. In addition, or in the alternative, fluid reservoir 172 includes a reservoir and a refueling mechanism that fills the fluid reservoir 110 on mobile spraying system 100. As shown, fluid reservoirs 110 include threads to removably couple to mobile spraying system 100. However, in other examples, fluid reservoirs 110 include other mechanisms to couple to mobile spraying system 100 such as a hydraulic quick release, etc.

Pressure supply 174 includes a reservoir(s) or vessel(s) that contain an amount of pressurized fluid. For example, pressure supply 174, as shown, includes an area containing a plurality of pressure supplies 112 that can replace the pressure supply 112 coupled to the mobile spraying system 100. In addition, or in the alternative, pressure supply 174 can include a reservoir and a refueling mechanism that fills the pressure supply 112 on mobile spraying system 100. As shown, pressure supplies 112 include threads to removably couple to mobile spraying system 100. However, in other examples pressure supplies 112 include other mechanisms to couple to mobile spraying system 100 such as a pneumatic quick release, etc.

Power supply 176, as shown, includes a plurality of power supplies 113, which in this instance, include batteries. These power supplies 113 can be interchanged with the power supply 113 on the mobile spraying system 100. Power supply 176 can also provide other functions, for instance, power supply 176 can recharge the battery on mobile spraying system 100 or recharge the batteries located within power supply 176.

Cleaning system 180, as shown, includes an area to purge the nozzle of fluid applicator assembly 108 to remove any debris from the nozzle. For instance, many nozzle tips are reversible which provides a nozzle cleaning function when the applicator is actuated while the nozzle tip is in a reversed orientation. Cleaning system 180, in some instances, can even replace a malfunctioning nozzle or fluid covered rotor 104 of mobile spraying system 100. Cleaning system 180, as shown, also include an area to dispose of expended pressure vessels, fluid vessels and/or batteries.

Resupply system 183, as shown, is configured to remove fluid reservoir 110, pressure supply 112 and power supply 113 from mobile spraying system 100. Resupply system 183 is also configured to connect a new set of new fluid reservoir 110, pressure supply 112 and power supply 113 to mobile spraying system 100.

FIG. 10 is a flow diagram showing an example spraying operation 500. Operation 500 begins at block 502 where controls parameters are set. Some example control parameters are indicated by blocks 504-510. As indicated by block 504, a control parameter can include a desired fluid thickness. For example, the desired fluid thickness can be set as a mil thickness value. As indicated by block 506, a control parameter can include a desired completion time. For example, the desired completion time can be set as an amount of time in which the spraying job is desired to be completed (e.g., two hours). As indicated by block 508, a control parameter can include machine parameters. For example, machine parameters can include the spray tip, the fluid, the pressure ranges, etc. Control parameters in block 502 can include other items as well as indicated by block 510.

Operation 500 proceeds at block 520 where a distance between the aerial spraying system to the target surface is calculated. For instance, computing system 116 or a different system can calculate a target distance between mobile spraying machine 100 and a target surface to achieve a desired outcome (e.g., a uniform fluid coverage at a desired thickness completed in a desired timeframe). The calculation of block 520 can be based on a variety of factors, examples of which are indicated by blocks 522-528. As indicated by block 522, the fluid being sprayed can be a factor of the calculation of block 520. For example, each fluid can specific characteristics that influence the way in which it is sprayed.

As indicated by block 524, the fluid can be factored into the calculation. For example, each tip creates a given spray pattern (e.g., a fan) such that the spray pattern or coverage width is a function of the width from the surface. Of course, the coverage width is relevant in many calculations. As indicated by block 526, the current pressure or available pressure range can be factored into the calculation of block 520. For example, altering the pressure of the sprayed fluid can affect the spray pattern/coverage rate and other aspects of the spraying operation.

Operation 500 proceeds at block 540 where an aerial velocity of aerial spraying system relative to target system is calculated. The calculation of block 540 can be based on a variety of factors, examples of which are indicated by blocks 542-548. As indicated by block 542, the spray pattern can be factored into calculating the mobile spraying system velocity. For example, the spray pattern typically dictates the width and distribution of the fluid coverage and as such factors into calculating the velocity of the mobile spraying system. As indicated by block 544, the flow rate and/or pressure can be factored into calculating the mobile spraying system velocity. For example, the flow rate and/or pressure dictate how much fluid is being sprayed towards the target surface and as such can factors into calculating the velocity of the mobile spraying machine (e.g., typically the higher the flow rate, the faster the velocity can be). As indicated by block 546, the desired thickness can be factored into calculating the mobile spraying system velocity. For example, typically as the desired thickness increases, the velocity of the mobile spraying machine decreases.

Operation 500 proceeds at block 560 where fluid flow through an applicator nozzle of mobile spraying system is calculated to achieve a desired thickness. The calculation of block 560 can be based on a variety of factors, examples of which are indicated by blocks 562-566. As indicated by block 562, the fluid flow can be calculated based on the spray pattern. As indicated by block 564, the fluid flow can be based on the mobile spraying system velocity. As indicated by block 566, the fluid flow can be based on other items as well.

Operation 500 proceeds at block 580 where the mobile spraying system is controlled based on the calculated distance, velocity, fluid flow amongst other factors. In some examples, these and other variables are recalculated intermittently throughout the spraying operation.

At least some embodiments are described herein in the context of applying a coating material, such as paint, to a target surface. As used herein, "paint" includes substances composed of coloring matter or pigment suspending in a liquid medium as well as substances that are free of coloring matter or pigment. "Paint" can also include preparatory coatings, such as primers. "Paint" can be applied to coat a target surface as a liquid or a gaseous suspension, for example, and the coating provided can be opaque, transparent, or semi-transparent. Some particular examples include, but are not limited to, latex paint, oil-based paint, stain, lacquers, varnish, inks, and the like.

It should also be noted that the different embodiments described herein can be combined in different ways. That is, parts of one or more embodiments can be combined with parts of one or more other embodiments. All of this is contemplated herein.

Example 1 is an aerial paint spraying vehicle comprising:

a body;

a paint reservoir removably coupled to the body and configured to store paint;

a pressure vessel removably coupled to the body and configured to pressurize the paint from the paint reservoir; and a paint applicator assembly configured to receive the pressurized paint and expel the pressurized paint through a spray nozzle towards a target surface.

Example 2 is the aerial paint spraying vehicle of any or all previous examples and further comprising a multi-axis gimbal configured to allow the spray nozzle to move along multiple axes relative to the body.

Example 3 is the aerial paint spraying vehicle of any or all previous examples further comprising a control system configured to control the multi-axis gimbal.

Example 4 is the aerial paint spraying vehicle of any or all previous examples wherein the control system receives a signal indicative of an orientation of the aerial paint spraying vehicle relative to the target surface and controls the multi-axis gimbal to orient the spray nozzle in a non-perpendicular orientation to the target surface during an expulsion of paint through the spray nozzle such that a reactive force parallel to the target surface is generated by the expulsion of paint.

Example 5 is the aerial paint spraying vehicle of any or all previous examples, wherein the spray nozzle expels the paint towards the target surface in a fan pattern.

Example 6 is the aerial paint spraying vehicle of any or all previous examples, further comprising a spray nozzle actuator that rotates the spray nozzle such that the fan pattern rotates.

Example 7 is the aerial paint spraying vehicle of any or all previous examples, wherein the spray nozzle actuator automatically rotates the spray nozzle such that the fan pattern is substantially perpendicular to a current movement direction of the aerial paint spraying vehicle.

Example 8 is the aerial paint spraying vehicle of any or all previous examples, wherein the paint applicator assembly comprises:

a valve assembly comprising a first end portion opposite of a second end portion configured to be movable between an open position and a closed position, wherein the second end portion is configured to be in fluidic contact with the pressurized paint at the closed position, and both the first end portion and the second end portion are configured to be in fluidic contact with the pressurized paint at the open position.

Example 9 is the aerial paint spraying vehicle of any or all previous examples, further comprising a reactive jet nozzle that actuates based on the actuation of the paint applicator assembly to generate a counter force that counters at least a portion of a reactive force generated by the paint applicator assembly when expelling the paint.

Example 10 is the aerial paint spraying vehicle of any or all previous examples, wherein the reactive jet nozzle is coupled to the spray nozzle such that an outlet of the reactive jet nozzle is axially aligned with an outlet of the spray nozzle.

Example 11 is the aerial paint spraying vehicle of any or all previous examples, further comprising a preparatory jet nozzle that generates a jet stream that generates a first reactive force that is substantially equal to a second reactive force generated by a paint expulsion from the spray nozzle, and wherein the preparatory jet nozzle generates of the jet stream before a paint expulsion from the spray nozzle and ceases the jet stream substantially simultaneously when the paint expulsion from the spray nozzle begins.

Example 12 is the aerial paint spraying vehicle of any or all previous examples, wherein the pressure vessel comprises compressed and liquid carbon dioxide.

Example 13 is the aerial paint spraying vehicle of any or all previous examples, wherein the paint reservoir comprises a first carbon-fiber tank with a first threaded connection mechanism and the pressure vessel comprises a second carbon-fiber tank with a second threaded connection mechanism.

Example 14 is a method of applying a paint to a target surface utilizing an aerial vehicle, the method comprising:

coupling a paint reservoir to the aerial vehicle;

coupling a pressure vessel to the aerial vehicle;

controlling the aerial vehicle to the target surface; and actuating a paint applicator on the aerial vehicle to apply the paint to the target surface.

Example 15 is the method of any or all previous examples, further comprising activating a preparatory jet nozzle prior to actuating the paint applicator and deactivating the preparatory jet nozzle substantially when actuating the paint applicator.

Example 16 is the method of any or all previous examples, further comprising activating a reactive jet nozzle that activates substantially simultaneously when actuating the paint applicator.

Example 17 is a mobile spraying system comprising:

an aerial vehicle;

a paint reservoir coupled to the aerial vehicle, the paint reservoir containing paint;

a pressure vessel containing a liquid propellant and configured to pressurize the paint from the paint reservoir; and a paint applicator configured to receive the pressurized paint and expel the pressurized paint towards a target surface.

Example 18 is the mobile spraying system of any or all previous examples, wherein the liquid propellant remains independent from the paint.

Example 19 is the mobile spraying system any or all previous examples, wherein the liquid propellant can be mixed with paint to enhance atomization.

Example 20 is the mobile spraying system of any or all previous examples, further comprising a gimbal configured to move the paint applicator in at least one axis independent of the aerial vehicle and wherein the gimbal controls the paint applicator to an orientation that is non-perpendicular to the target surface such that a parallel reactive force generated by the paint applicator propels the aerial vehicle.

Example 21 is the mobile spraying system of any or all previous examples, wherein the pressure vessel is communicatively coupled to a jet nozzle that actuates when the paint applicator expels the paint towards the target surface, such that a reactive force generated by the paint applicator is countered by a force generated by the jet nozzle.

Example 22 is the mobile spraying system of any or all previous examples, wherein the system employs the reaction force from the spray nozzle to propel the system, in a forward direction.

Example 23 is the mobile spraying system of any or all previous examples, wherein the pressure vessel comprises compressed and liquid carbon dioxide or high-pressure air/nitrogen.

Example 24 is the method of any or all previous examples, further comprising activating a preparatory jet nozzle prior to actuating the paint applicator and deactivating/minimizing the force of the preparatory jet nozzle substantially when actuating the paint applicator.

Example 25 is the mobile spraying system of any or all previous examples, wherein the liquid propellant can be mixed with paint to enhance atomization.

Example 26 is the mobile spraying system of any or all previous examples, further comprising a paint applicator assembly configured to receive the pressurized paint and air, and expel the fluids through multiple orifices, that can interact and spray over a target substrate.

Example 27 is the mobile spraying system of any or all previous examples, wherein the spray nozzle actuator automatically rotates the spray nozzle such that the fan pattern is substantially perpendicular to a current movement direction of the aerial paint spraying vehicle and the fan pattern is substantially perpendicular to the target surface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An aerial paint spraying vehicle comprising:
   a body;
   a rotor configured to rotate and provide a lift force on the body;
   a paint reservoir removably coupled to the body and configured to store paint;
   a pressure vessel removably coupled to the body and configured to pressurize the paint from the paint reservoir;
   a paint applicator assembly configured to receive the pressurized paint and expel the pressurized paint through a spray nozzle towards a target surface; and
   a preparatory jet nozzle configured to generate a jet stream that generates a first reactive force that is substantially equal to a second reactive force generated by a paint expulsion from the spray nozzle, wherein the preparatory jet nozzle is configured to generate the jet stream before the paint expulsion from the spray nozzle and cease the jet stream substantially simultaneously when the paint expulsion from the spray nozzle begins.

2. The aerial paint spraying vehicle of claim 1, further comprising a multi-axis gimbal configured to allow the spray nozzle to move along multiple axes relative to the body.

3. The aerial paint spraying vehicle of claim 2, further comprising a control system configured to control the multi-axis gimbal.

4. The aerial paint spraying vehicle of claim 3, wherein the control system receives a signal indicative of an orientation of the aerial paint spraying vehicle relative to the target surface and controls the multi-axis gimbal to orient the spray nozzle in a non-perpendicular orientation to the target surface during an expulsion of paint through the spray nozzle such that a reactive force parallel to the target surface is generated by the expulsion of paint.

5. The aerial paint spraying vehicle of claim 1, wherein the spray nozzle expels the paint towards the target surface in a fan pattern.

6. The aerial paint spraying vehicle of claim 5, further comprising a spray nozzle actuator that rotates the spray nozzle such that the fan pattern rotates.

7. The aerial paint spraying vehicle of claim 6, wherein the spray nozzle actuator automatically rotates the spray nozzle such that the fall pattern is substantially perpendicular to a current movement direction of the aerial paint spraying vehicle.

8. The aerial paint spraying vehicle of claim 1, wherein the paint applicator assembly comprises;
   a valve assembly comprising a first end portion opposite of a second end portion configured to be movable between an open position and a closed position, wherein the second end portion is configured to be in fluidic contact with the pressurized paint at the closed position, and both the first end portion and the second end portion are configured to be in fluidic contact with the pressurized paint at the open position.

9. The aerial paint spraying vehicle of claim 1, further comprising a reactive jet nozzle that actuates based on the actuation of the paint applicator assembly to generate a counter force that counters at least a portion of a reactive force generated by the paint applicator assembly when expelling the paint.

10. The aerial paint spraying vehicle of claim 9, wherein the reactive jet nozzle is coupled to the spray nozzle such that an outlet of the reactive jet nozzle is axially aligned with an outlet of the spray nozzle.

11. The aerial paint spraying vehicle of claim 1, wherein the pressure vessel comprises compressed and liquid carbon dioxide.

12. The aerial paint spraying vehicle f claim 1, wherein the paint reservoir comprises a first carbon-fiber tank with a first threaded connection mechanism and the pressure vessel comprises a second carbon-fiber tank with a second threaded connection mechanism.

13. A method of operating an aerial paint spraying vehicle, the method comprising:
   operating a rotor to provide a lift force on a body of the aerial paint spraying vehicle, the aerial paint spraying vehicle comprising:

a paint reservoir removably coupled to the body and configured to store paint, and a pressure vessel removably coupled to the body and configured to pressurize the paint from the paint reservoir:

before operating a spray nozzle of the aerial paint spraying vehicle to expel the pressurized paint through the spray nozzle towards a target surface, operating a preparatory jet nozzle to generate a jet stream that generates a first reactive three that is substantially equal to a second reactive force generated by a paint expulsion from the spray nozzle; and ceasing the jet stream substantially simultaneously when the paint expulsion from the spray nozzle begins.

14. The method of claim 13, and further comprising;
based on the operation of the spray nozzle, actuating a reactive jet nozzle to generate a counter force that counters at least a portion of reactive force generated by the spray nozzle when expelling the paint.

15. The method of claim 14, wherein the reactive jet nozzle is coupled to the spray nozzle such that tar outlet of the reactive jet nozzle is axially aligned with an outlet of the spray nozzle.

16. The method of claim 13, and further comprising:
operating, a spray nozzle actuator that rotates the spray nozzle.

17. The method of claim 16, wherein operating the spray nozzle actuator comprises:
automatically rotating the spray nozzle such that a fan pattern generated by the spray nozzle is substantially perpendicular to a current movement direction of the aerial paint spraying vehicle.

18. The method of claim 13, and further comprising:
controlling a multi-axis gimbal to move the spray nozzle along multiple axes relative to the body.

19. The method of claim 18, and further comprising:
receiving a signal indicative of an orientation of the aerial paint spraying vehicle relative to the target surface; and
controlling the multi-axis gimbal to orient the spray nozzle in a non-perpendicular orientation to the target surface during the paint expulsion through the spray nozzle.

20. The method of claim 19, wherein the paint expulsion generates a reactive force parallel to the target surface.

* * * * *

UNITED STATES PATENT AND TRADEMARK OFFICE
CERTIFICATE OF CORRECTION

| | |
|---|---|
| PATENT NO. | : 11,065,636 B2 |
| APPLICATION NO. | : 16/273638 |
| DATED | : July 20, 2021 |
| INVENTOR(S) | : Brian Lee Fideler and Jeshwanth Durga Sagar Kundem |

Page 1 of 1

It is certified that error appears in the above-identified patent and that said Letters Patent is hereby corrected as shown below:

In the Claims

Claim 12 (Line 1): Please replace the 'f' with: 'of'.

Claim 13 (Line 15): Please replace 'three' with: 'force'.

Claim 14 (Line 4): Please add 'a', immediately before 'reactive force'.

Claim 15 (Line 2): Please replace 'tar' with: 'an'.

Claim 16 (Line 2): Please remove the ',' immediately following the term 'operating'.

Signed and Sealed this
Seventh Day of January, 2025

Derrick Brent
*Acting Director of the United States Patent and Trademark Office*